(12) United States Patent
Yamashita et al.

(10) Patent No.: US 7,341,794 B2
(45) Date of Patent: Mar. 11, 2008

(54) LAMINATED FILM

(75) Inventors: Takashi Yamashita, Kanagawa (JP); Gen Kanai, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 79 days.

(21) Appl. No.: 10/490,109

(22) PCT Filed: Sep. 25, 2002

(86) PCT No.: PCT/JP02/09837

§ 371 (c)(1),
(2), (4) Date: Mar. 25, 2004

(87) PCT Pub. No.: WO03/026890

PCT Pub. Date: Apr. 3, 2003

(65) Prior Publication Data
US 2004/0216846 A1 Nov. 4, 2004

(30) Foreign Application Priority Data
Sep. 26, 2001 (JP) .............................. 2001-293386

(51) Int. Cl.
B32B 27/08 (2006.01)
B29C 47/06 (2006.01)
(52) U.S. Cl. .................. 428/516; 156/244.11; 428/515
(58) Field of Classification Search ................ 428/516, 428/515; 156/244.11
See application file for complete search history.

(56) References Cited

U.S. PATENT DOCUMENTS 5,795,946 A * 8/1998 Agarwal et al. ......... 526/348.1
5,849,127 A * 12/1998 Kuo ....................... 156/244.11
5,962,092 A * 10/1999 Kuo et al. ................. 428/34.9

FOREIGN PATENT DOCUMENTS

| JP | 7-117197 | 5/1995 |
|---|---|---|
| JP | 10-80987 | 3/1998 |
| JP | 10-180964 | 7/1998 |
| JP | 2000-17086 | 1/2000 |
| JP | 2000-62117 | 2/2000 |
| JP | 2000-85073 | 3/2000 |
| JP | 2000-229391 | 8/2000 |
| JP | 2001-219514 | 8/2001 |
| JP | 2001-260291 | 9/2001 |

* cited by examiner

Primary Examiner—D. S Nakarani
(74) Attorney, Agent, or Firm—Oblon, Spivak, McClelland, Maier & Neustadt, P.C.

(57) ABSTRACT

A laminated film of a propylene resin layer and an ethylene resin layer is provided, which does not require solvent removal and recovery devices, etc., is low in influences against working environments and a danger of occurrence of fire, and has a high interlaminar adhesive force. That is, the invention relates to a laminated film prepared by melt extrusion laminating, without via an anchor coating agent, an ethylene based resin mainly comprising a linear ethylene/α-olefin copolymer having: a density of from 0.870 to 0.910 g/cm$^3$; and an MFR of from 1 to 100 g/10 min., the copolymer being obtained by copolymerizing ethylene and an α-olefin having from 3 to 20 carbon atoms, on the surface of a propylene based resin film formed from a crystalline propylene based random copolymer resin having a melting peak temperature of not higher than 140° C., as prepared using a metallocene catalyst.

15 Claims, No Drawings

LAMINATED FILM

TECHNICAL FIELD

The present invention relates to a laminated film having excellent interlaminar adhesion between a propylene based resin layer and an ethylene based resin layer. In detail, the invention relates to a laminated film having excellent interlaminar adhesion between a propylene based resin layer and an ethylene based resin layer, which can be used in print laminate films for surface protection, impartation of water resistance and oil resistance, impartation of gloss, etc. on package bags, printing papers, photographs, etc.

BACKGROUND ART

Polyolefin resin films are broadly used for the purposes such as surface protection, impartation of water resistance and oil resistance, and enhancement of surface gloss on packaging bags and printing papers. In particular, it is broadly practiced that a film is subjected to thermocompression bonding to the surface of a printed paper to achieve surface protection. As films to be used for such a purpose, are frequently used laminated films comprising a low-melting ethylene based resin laminated on a biaxially stretched polypropylene film substrate having excellent optical characteristics in gloss and transparency.

As such laminated films, there are proposed laminated films prepared by laminating a resin composition comprising a mixture of an ethylene/alkyl ester copolymer and an ethylene/vinyl acetate copolymer on a biaxially stretched polypropylene film substrate by the melt extrusion lamination method (JP-A-56-42652, JP-B-4-2431, and JP-A-3-73341) and a process of producing print laminate articles by laminating a resin adhesive layer in which an ethylene based resin is compounded in a linear ethylene/α-olefin copolymer prepared by using a metallocene compound as a catalyst only by thermocompression bonding (JP-A-7-117197).

In the case of laminating an ethylene based resin on a biaxially stretched polypropylene film substrate, for attaining interlaminar adhesion at levels at which no practical problem occurs, it was necessary to oxidize the film substrate and laminate the ethylene based resin via an anchor coating agent.

However, the method of using an anchor coating agent involved problems such that a drying step of the solvent is necessary so that the equipment becomes large-scaled; the working environment becomes worse with diffusion of a solvent odor emitted during the drying; that a danger of occurrence of fire is high; and that a processing rate cannot be increased due to limits of a coating or drying ability.

Further, at present, in films prepared by laminating a resin adhesive layer on a biaxially stretched polypropylene based film substrate without using an anchor coating agent, an interlaminar adhesive force between the film substrate and the resin adhesive layer is weak, and after thermocompression bonding to a printing paper, bubbles remain between the printing paper and the film to form portions having low transparency, whereby visibility of printing information is impaired to deteriorate an appearance (collapse). Moreover, since peeling easily occurs between the stretched polypropylene based film and the resin adhesive layer, a laminate adhesive strength is weak, leading to a problem such that the resulting articles cannot be used as a commercial product.

The invention is to provide a laminated film of a propylene resin layer and an ethylene resin layer, which does not require solvent removal and recovery devices, etc., is low in influences against working environments and a danger of occurrence of fire, and has a high interlaminar adhesive force without using an anchor coating agent.

DISCLOSURE OF THE INVENTION

In order to solve these problems, the invention has been made as a result of extensive and intensive investigations.

Specifically, according to a first invention of the invention, there is provided a laminated film prepared by melt extrusion laminating, without via an anchor coating agent, an ethylene based resin mainly comprising a linear ethylene/α-olefin copolymer having: a density of from 0.870 to 0.910 $g/cm^3$; and an MFR of from 1 to 100 g/10 min., the copolymer being obtained by copolymerizing ethylene and an α-olefin having from 3 to 20 carbon atoms, on the surface of a propylene based resin film formed from a crystalline propylene based random copolymer resin having a melting peak temperature of not higher than 140° C., as prepared using a metallocene catalyst.

Also, according to a second invention of the invention, there is provided the laminated film according to the first invention, wherein the the crystalline propylene based random copolymer resin has a ratio of 0.5 or more ($\Delta Hm_{130}$/$\Delta Hm$) of a heat of fusion up to 130° C. ($\Delta Hm_{130}$) to a whole heat of fusion ($\Delta Hm$).

Also, according to a third invention of the invention, there is provided the laminated film according to the first or second invention, wherein the ethylene based resin is a polyethylene mixture comprising; from 60 to 99% by weight of a linear ethylene/α-olefin copolymer having a density of from 0.870 to 0.910 $g/cm^3$ and an MFR of from 1 to 100 g/10 min., the copolymer being obtained by copolymerizing ethylene and an α-olefin having from 3 to 20 carbon atoms; and from 1 to 40% by weight of a high-pressure process low-density polyethylene having an MFR of from 1 to 50 g/10 min.

Also, according to a fourth invention of the invention, there is provided the laminated film according to any one of the first to third inventions, wherein the linear ethylene/α-olefin copolymer has an elution amount at 80° C. of 90% by weight or more by the temperature rising elution fractionation (TREF) measurement, based on the total amount of the copolymer.

Also, according to a fifth invention of the invention, there is provided the laminated film according to any one of the first to fourth inventions, wherein the linear ethylene/α-olefin copolymer is one prepared using a metallocene catalyst.

Also, according to a sixth invention of the invention, there is provided The laminated film according to any one of the first to fifth inventions, wherein the temperature of melt extrusion laminating the ethylene based resin is from 150 to 300° C.

Also, according to a seventh invention of the invention, there is provided a print laminate article prepared by thermal laminating: the surface of the ethylene based resin of the laminated film according to any one of the first to sixth inventions; and a printing paper.

BEST MODE FOR CARRYING OUT THE INVENTION

[Crystalline Propylene Based Random Copolymer Resin]

As the crystalline propylene based random copolymer resin, are used ones having a melting peak temperature (hereinafter abbreviated as "Tm") of not higher than 140° C., preferably from 80 to 140° C., and particularly preferably from 90 to 135° C. When the Tm exceeds 140° C., the adhesion to the ethylene based resin to be extrusion laminated is inferior, the appearance (collapse) of print laminate articles thermocompression bonded on printing papers, etc. is deteriorated, and the adhesive strength of print laminate articles becomes worse.

Here, the Tm is a value measured by a differential scanning calorimeter (DSC). Using a differential scanning calorimeter (DSC) manufactured by Seiko Instruments Inc., about 5 mg of a sample was taken and kept at 200° C. for 5 minutes, and then cooled to 40° C. at a temperature decrease speed of 10° C./min. Subsequently, the sample was melted at a temperature increase speed of 10° C./min. to prepare a curve of heat of fusion, from which is obtained Tm. That is, the maximum peak temperature of the curve of heat of fusion was defined to be Tm.

The crystalline propylene based random copolymer resin preferably has a ratio ($\Delta Hm_{130}/\Delta Hm$) of a heat of fusion ($\Delta Hm_{130}$) up to 130° C. to a whole heat of fusion ($\Delta Hm$) of 0.5 or more, and more preferably 0.6 or more. When the $\Delta Hm_{130}/\Delta Hm$ is less than 0.5, the adhesive strength to the ethylene based resin to be extrusion laminated may possibly lower, and the adhesive strength of print laminate articles may possibly lower.

Here, $\Delta Hm$ and $\Delta Hm_{130}$ are values measured by a differential scanning calorimeter (DSC). The $\Delta Hm$ and $\Delta Hm_{130}$ are obtained from the foregoing curve of heat of fusion. That is, in the curve of heat of fusion, a temperature at which the first heat absorption starts is connected to a temperature at which the heat absorption is completed in a straight line, which is then defined to be a base line for determining the heat of fusion. A heat of fusion corresponding to a portion surrounded by the curve of heat of fusion and the base line was defined to be a whole heat of fusion ($\Delta Hm$), and a heat of fusion up to 130° C. as computed from the lower temperature side was defined to be a heat of fusion ($\Delta Hm_{130}$) up to 130° C.

Also, the crystalline propylene based random copolymer resin preferably has a melt flow rate (according to JIS-K6921, at 230° C. with a load of 2.16 kg) of from 0.1 to 50 g/10 min., and more preferably from 0.5 to 40 g/10 min. When the MFR falls outside the foregoing range, film processability is likely inferior.

Also, the crystalline propylene based random copolymer resin that is used in the invention preferably has a ratio (Mw/Mn) of a weight average molecular weight (Mw) to a number average molecular weight (Mn) of from 1.5 to 4.5, more preferably from 1.8 to 4.0, and most preferably from 2.0 to 3.0. When the Mw/Mn exceeds the foregoing range, the interlaminar adhesion tends to lower, whereas when it is less than the foregoing range, film processability may possibly become worse.

As the method of adjusting the Mw/Mn within a prescribed range, is enumerated one of selecting a proper metallocene catalyst.

Incidentally, the measurement of Mw/Mn was carried out by gel permeation chromatography (GPC) The measurement condition is as follows.

Analyzer: GPC 150C Model manufactured by Waters
Detector: 1A infrared spectrophotometer manufactured by MIRAN (measurement wavelength: 3.42 μm)
Column: Three columns of AD806M/S manufactured by Showa Denko K.K. (column calibration was carried out by measuring mono-dispersed polystyrene manufactured by Tosoh Corporation (a 0.5 mg/mL solution of each of A500, A2500, F1, F2, F4, F10, F20, F40, and F288) and approximating logarithmic values of elution volume and molecular weight by a secondary equation. Further, the molecular weight of a sample was reduced into polypropylene using viscosity equations of polystyrene and polypropylene. Here, a coefficient of the viscosity equation of polystyrene is $\alpha=0.723$ and log $K=-3.967$, and a coefficient of the viscosity equation of polypropylene is $\alpha=0.707$ and log $K=-3.616$.)

| Measurement temperature: | 140° C. |
| Concentration: | 20 mg/10 mL |
| Amount of charge: | 0.2 mL |
| Solvent: | o-Dichlorobenzene |
| Flow rate: | 1.0 mL/min. |

The crystalline propylene based random copolymer resin that is used in the invention is a random copolymer of propylene and an α-olefin, as prepared using a metallocene catalyst. Examples of α-olefins to be random copolymerized with propylene in the crystalline propylene based random copolymer resin include α-olefins having from 2 to 20 carbon atoms (provided that propylene is excluded), specific examples include ethylene, 1-butene, 1-pentene, 1-hexene, 1-heptene, 1-octene, 4-methyl-pentene-1, 4-methyl-hexene-1, and 4,4-dimethylpentene-1. The α-olefins may be used singly or in admixture of two or more thereof. Above all, an α-olefin having two carbon atoms, i.e., ethylene is most preferable.

Incidentally, the metallocene catalyst will be described later.

In the crystalline propylene based random copolymer resin, the propylene content is preferably from 60 to 99% by weight, and more preferably from 65 to 98% by weight, and the α-olefin content is preferably from 1 to 40% by weight, and more preferably from 2 to 35% by weight.

To the foregoing crystalline propylene based random copolymer resin, various additives such as nucleating agents, lubricants, anti-blocking agents, antioxidants, weathering stabilizers, antistatic agents, anti-fogging agents, colorants, and low-molecular weight polymers can be added as the need arises, within the range where the purpose of the invention is not hindered.

[Ethylene Based Resin]

The ethylene based resin that is used in the laminated film of the invention is one mainly comprising a linear ethylene/α-olefin copolymer. Such a linear ethylene/α-olefin copolymer is a linear ethylene/α-olefin copolymer comprising ethylene having an α-olefin having from 3 to 20 carbon atoms copolymerized therewith.

Examples of α-olefins of the linear ethylene/α-olefin copolymer include α-olefins having from 3 to 20 carbon atoms. Specific examples include propylene, 1-butene, 1-pentene, 1-hexene, 1-octene, 1-heptene, 4-methyl-pentene-1, 4-methyl-hexene-1, and 4,4-dimethylpentene-1. α-Olefins having from 3 to 12 carbon atoms are preferable, and α-olefins having from 3 to 8 carbon atoms are more preferable. The α-olefins may be used singly or in admixture of two or more thereof.

In the linear ethylene/α-olefin copolymer, the ethylene content is preferably from 60 to 99% by weight, and more preferably from 65 to 98% by weight, and the α-olefin content is preferably from 1 to 40% by weight, and more preferably from 2 to 35% by weight.

The linear ethylene/α-olefin copolymer has a density of from 0.870 to 0.910 g/cm$^3$, and preferably from 0.875 to 0.900 g/cm³. When the density is less than 0.870 g/cm³, moldability is inferior, blocking properties become worse, and elongation and breakage of the laminated film possibly occur during thermocompression bonding to printing papers, etc. When the density exceeds 0.910 g/cm³, adhesion to the printing surface of a printing body is inferior, and collapse occurs so that the appearance becomes worse. Incidentally, the density is a value measured using a strand for MFR measurement by the density-gradient tube method according to JIS K6922.

Also, the linear ethylene/α-olefin copolymer has an MFR (according to JIS-K6922, at 190° C. with a load of 2.16 kg) of from 1 to 100 g/10 min., and preferably from 5 to 80 g/10 min. When the MFR exceeds 100 g/10 min., since the melt viscosity is too low, film formability is inferior, whereas when the MFR is less than 1 g/10 min., the appearance (collapse) of print laminate articles thermocompression bonded to printing papers, etc. becomes worse.

Also, the linear ethylene/α-olefin copolymer has an elution amount at 80° C. by the temperature rising elution fractionation (hereinafter abbreviated as "TREF") measurement of 90% by weight or more, and preferably 95% by weight or more based on the total amount of the copolymer from the viewpoint of print laminate adaptability.

Incidentally, the TREF measurement is carried out on a basis of a principle described in *Journal of Applied Polymer Science*, Vol. 26, 4217-4231 (1981) and *KOBUNSHI RONBURSHU* (Japanese Journal of Polymer Science and Technology), 2P1C09 (1985) in the following manner. In a column charged with an inert carrier, the polymer is completely dissolved in a solvent and supplied, and then cooled to form a thin polymer layer on the surface of the inert carrier. Subsequently, the temperature is raised under a prescribed condition, and the amount of the polymer having been eluted up to that temperature is continuously measured to obtain a curve expressing the relationship between the elution amount and the elution temperature. A formulation distribution of the polymer can be seen from the shape of such a curve.

The details of the TREF measurement will be hereunder described. A cross fractionation analyzer (CFC T101 manufactured by Dia Instruments Co., Ltd.) was used as a measurement analyzer. This cross fractionation analyzer is one comprising a temperature rising elution fractionation (TREF) mechanism for fractionating a sample utilizing a difference in dissolution temperature, which is connected to a size exclusion chromatograph (SEC) for further fractionating the fractionated section in a molecular size by on-line.

First of all, a solution of a measurement sample in o-dichlorobenzene (concentration: 3 mg/mL) is charged in an amount of 0.4 mL into a stainless steel-made column having an inner diameter of 4 mm and a length o 150 mm and having glass beads as an inert carrier filled therein. Subsequently, the column is cooled from 140° C. to 0° C. at a rate of 1° C./min. to coat the sample on the inert carrier. After keeping the column at 0° C. for 30 minutes, 2 mL of the component dissolved at a temperature of 0° C. is charged from the TREF column into the SEC column (three columns of AD806MS manufactured by Show Denko K.K.) at a flow rate of 1 mL/min. During a time when the fractionation in a molecular size by SEC is carried out, the TREF column is raised to the following elution temperature and kept at that temperature for about 30 minutes. The measurement of each elution section in SEC was carried out at intervals of 39 minutes. The elution temperature is stepwise raised according to the following temperatures. 0, 5, 10, 15, 20, 25, 30, 35, 40, 45, 49, 52, 55, 58, 61, 64, 67, 70, 73, 76, 79, 82, 85, 88, 91, 94, 97, 100, 102, 120, 140° C.

The solution having been fractionated in a molecular size by SEC is measured for absorbance that is in proportion to the polymer concentration by an infrared spectrophotometer attached to the analyzer (detected by stretching vibration of methylene at a wavelength of 3.42 µm), whereby a chromatogram of each elution temperatures section is obtained. Using a built-in data-processing software, a base line of the chromatogram of each elution temperature section obtained the foregoing measurement is drawn, followed by arithmetic processing. An area of each chromatogram is integrated, and an integral elution curve is calculated. On this integral elution curve, the elution amount at an elution temperature of 80° C. was defined to be an elution amount at 80° C. by the temperature rising elution fractionation measurement.

Also, the linear ethylene/α-olefin copolymer has a ratio (Mw/Mn) of a weight average molecular weight to a number average molecular weight of from 1.5 to 3.0, preferably from 1.6 to 2.8, and more preferably from 1.7 to 2.5. When the Mw/Mn exceeds the foregoing range, transparency lowers, and hence, such is not preferable. On the other hand, when it is less than the foregoing range, an extrusion load increases, or sharkskin likely occurs, so that processing adaptability may possibly become worse.

Incidentally, the measurement of Mw/Mn was carried out by gel permeation chromatography (GPC). The measurement condition is as follows.

Analyzer: GPC 150C Model manufactured by Waters

Detector: 1A infrared spectrophotometer manufactured by MIRAN (measurement wavelength: 3.42 µm)

Column: Three columns of AD806M/S manufactured by Showa Denko K.K. (Column calibration was carried out by measuring mono-dispersed polystyrene manufactured by Tosoh Corporation (a 0.5 mg/mL solution of each of A500, A2500, F1, F2, F4, F10, F20, F40, and F288) and approximating logarithmic values of elution volume and molecular weight by a secondary equation. Further, the molecular weight of a sample was reduced into polyethylene using viscosity equations of polystyrene and polyethylene. Here, a coefficient of the viscosity equation of polystyrene is α=0.723 and log K=−3.967, and a coefficient of the viscosity equation of polyethylene is α=0.733 and log K=−3.407.)

| | |
|---|---|
| Measurement temperature: | 140° C. |
| Concentration: | 20 mg/10 mL |
| Amount of charge: | 0.2 mL |
| Solvent: | o-Dichlorobenzene |
| Flow rate: | 1.0 mL/min. |

To the foregoing linear ethylene/α-olefin copolymer, various additives such as nucleating agents, lubricants, antiblocking agents, antioxidants, weathering stabilizers, antistatic agents, anti-fogging agents, colorants, and low-molecular weight polymers can be added as the need arises, within the range where the purpose of the invention is not hindered.

The linear ethylene/α-olefin copolymer is suitably prepared using a metallocene catalyst. The metallocene catalyst will be described later.

For improving processability during the extrusion lamination processing (surging phenomenon or neck-in), the linear ethylene/α-olefin copolymer can be mixed with a high-pressure process low-density polyethylene having an MFR (according to JIS-K6922, at 190° C. with a load of 2.16 kg) of from 1 to 50 g/10 min.

With respect to the compounding ratio, the proportion of the linear ethylene/α-olefin copolymer is from 60 to 99% by weight, preferably from 70 to 97% by weight, and more preferably from 80 to 95% by weight. The proportion of the high-pressure process low-density polyethylene is from 1 to 40% by weight, preferably from 3 to 30% by weight, and more preferably from 5 to 20% by weight. When the proportion of the high-pressure process low-density polyethylene is less than 1% by weight, a surging phenomenon likely occurs, and neck-in increases, so that processability tends to be inferior. On the other hand, when the proportion of the high-pressure process low-density polyethylene exceeds 40% by weight, collapse properties and gloss of print laminate articles may possibly become worse.

The metallocene catalyst that is used during the preparation of the crystalline propylene based random copolymer resin and the linear ethylene/α-olefin copolymer will be hereunder described.

As the metallocene catalyst, ones that are known can be used, but examples include catalysts comprising a transition metal compound of the Groups 4 to 6 of the Periodic Table containing a ligand having a cyclopentadienyl skeleton, a co-catalyst, and if desired, an organoalumnum compound and a carrier.

Here, in the transition metal compound of the Groups 4 to 6 of the Periodic Table containing a ligand having a cyclopentadienyl skeleton, examples of the cyclopentadienyl skeleton include a cyclopentadienyl group and a substituted cyclopentadienyl group. As the substituent of the substituted cyclopentadienyl group, is enumerated at least one kind of substituents selected from a hydrocarbon group having from 1 to 20 carbon atoms, a halogen group, a halogen-containing hydrocarbon group having from 1 to 20 carbon atoms, an alkoxy group, an aryloxy group, a silicon-containing hydrocarbon group, a phosphorus-containing hydrocarbon group, a nitrogen-containing hydrocarbon group, a boron-containing hydrocarbon group, a silyl group, a silyl-substituted alkyl group, a silyl-substituted aryl group, a cyano group, a cyanoalkyl group, a cyanoaryl group, and a halosilyl group. Two or more substituents of the substituted cyclopentadienyl group may be present, or the substituents may be bonded to each other to form a ring. The ring formed when the substituents are bonded to each other may further have a substituent.

Examples of the foregoing hydrocarbon group having from 1 to 20 carbon atoms include an alkyl group, a cycloalkyl group, an aryl group, and an aralkyl group. Specific examples include alkyl groups such as a methyl group, an ethyl group, an n-propyl group, an isopropyl group, an n-butyl group, an isobutyl group, a sec-butyl group, a t-butyl group, a pentyl group, a hexyl group, an octyl group, a 2-ethylhexyl group, and a decyl group; cycloalkyl groups such as a cyclopentyl group and a cyclohexyl group; aryl groups such as a phenyl group and a tolyl group; and aralkyl groups such as a benzyl group and a neophyl group.

In the case where substituents or hydrocarbons are bonded to each other to form one or two or more rings, examples of the cyclopentadienyl group include an indenyl group, a substituted indenyl group substituted with a substituent such as hydrocarbon groups having from 1 to 8 carbon atoms (such as alkyl groups), a naphthyl group, a substituted naphthyl group substituted with a substituent such as hydrocarbon groups having from 1 to 8 carbon atoms (such as alkyl groups), a fluorenyl group, a substituted fluorenyl group substituted with a substituent such as hydrocarbon groups having from 1 to 8 carbon atoms (such as alkyl groups), an azulenyl group, and a substituted azulenyl group substituted with a substituent such as hydrocarbon groups having from 1 to 8 carbon atoms (such as alkyl groups).

With respect to the transition metal compound of the Groups 4 to 6 of the Periodic Table containing a ligand having a cyclopentadienyl skeleton, examples of transition metals include zirconium, titanium, and hafnium, with zirconium and hafnium being particularly preferable. The transition metal compound usually has from one to three ligands having a cyclopentadienyl skeleton, and in the case where it has two or more ligands, the ligands may be bonded to each other with a crosslinking group. Incidentally, examples of the crosslinking group include an alkylene group, an alkylidene group, a silylene group, and a germylene group. In these groups, the hydrogen atom or atoms may be substituted with an alkyl group, a halogen, etc.

In the transition metal compounds of the Groups 4 to 6 of the Periodic Table, representative examples of ligands other than the ligand having a cyclopentadienyl skeleton include hydrogen, a halogen group, a hydrocarbon group having from 1 to 20 carbon atoms (such as alkyl groups, alkenyl group, aryl groups, alkylaryl groups, aralkyl groups, and polyenyl groups), an oxygen-containing hydrocarbon group having from 1 to 20 carbon atoms, a nitrogen-containing hydrocarbon group having from 1 to 20 carbon atoms, a phosphorus-containing hydrocarbon group having from 1 to 20 carbon atoms, and a silicon-containing hydrocarbon group having from 1 to 20 carbon atoms.

Non-limitative examples of transition metal compounds of the Groups 4 to 6 of the Periodic Table containing a ligand having a cyclopentadienyl skeleton include as follows.

Bis(cyclopentadienyl)zirconium dichloride, bis(indenyl)zirconium dichloride, bis(fluorenyl)zirconium dichloride, bis(azulenyl)zirconium dichloride, bis(4,5,6,7-tetrahydroindenyl)zirconium dichloride, (cyclopentadienyl)-(3,4-dimethylcyclopentadienyl)zirconium dichloride, methylenebis(cyclopentadienyl)zirconium dichloride, methylene(cyclopentadienyl)(3,4-dimethylcyclopentadienyl) zirconium dichloride, isopropylidene (cyclopentadienyl) (3,4-dimethylcyclopentadienyl)zirconium dichloride, ethylene(cyclopentadienyl)(3,5-dimethylpentadienyl)zirconium dichloride, methylenebis(indenyl)zirconium dichloride, ethylenebis-(2-methylindenyl)zirconium dichloride, ethylene 1,2-bis(4-phenylindenyl)zirconium dichloride, ethylene(cyclopentadienyl)(fluorenyl)zirconium dichloride, dimethylsilylene(cyclopentadienyl)(tetramethylcyclopentadienyl) zirconium dichloride, dimethylsilylenebis-(indenyl) zirconium dichloride, dimethylsilylenebis-(4,5,6,7-tetrahydroindenyl)zirconium dichloride, dimethylsilylene (cyclopentadienyl)(fluorenyl)zirconium dichloride, dimethylsilylene(cyclopentadienyl)(octahydrofluorenyl)zirconium dichloride, methylphenylsilylenebis[1-(2-methyl-4,5-benzoindenyl)]zirconium dichloride, dimethylsilylenebis[1-(2-methyl-4,5-benzoindenyl)]zirconium dichloride, dimethylsilylenebis[1-(2-methyl-4H-azulenyl)]-zirconium dichloride, dimethylsilylenebis[1-(2-methyl-4-(4-chlorphenyl)-4H-azulenyl)]zirconium dichloride, dimethylsilylenebis[1-(2-ethyl-4-(4-chlorophenyl)-4H-azulenyl)]zirconium dichloride, dimethylsilylenebis[1-(2-ethyl-4-naphthyl-4H-azulenyl)]zirconium dichloride, diphenylsilylenebis[1-(2-methyl-4-(4-chlorophenyl)-4H-azulenyl)]zirconium dichloride, dimethylsilylenebis[1-(2-methyl-4-(phenylindenyl))]zirconium dichloride, dimethylsilylenebis[1-(2-ethyl-4-(phenylindenyl))]zirconium dichloride, dimethylsilylenebis[1-(2-ethyl-4-napthyl-4H-azulenyl)]zirconium dichloride, dimethylgermylenebis(indenyl)zirconium dichloride, and dimethylgermylene(cyclopentadienyl)(fluorenyl)zirconium dichloride.

Also, with respect to other transition metal compounds of the Groups 4, 5 and 6 such as titanium compounds and hafnium compounds, similar compounds to those described above are enumerated. The transition metal compounds of the Groups 4 to 6 of the Periodic Table containing a ligand having a cyclopentadienyl skeleton may be used singly or in admixture of two or more thereof.

The co-catalyst means one capable of making the foregoing transition metal compound of the Groups 4 to 6 of the Periodic Table effective as a polymerization catalyst, or equilibrating ionic charges in the catalytically activated state. Examples of the co-catalyst that can be used in the invention include organoaluminum oxy-compounds such as alumoxane, Lewis acids, ion-exchangeable phyllosilicates, boron compounds, lanthanoid compounds such as lanthanum oxide, and tin oxide.

The organoaluminum compound that can be used as the need arises is a compound represented by the general formula, $(AlR^4{}_pX_{3-p})_q$. In the invention, as a matter of course, the compound represented by this formula can be used in admixture of plural kinds thereof or in combination. Also, the compound can be used not only during catalyst preparation but also during preliminary polymerization or polymerization. In the formula, $R^4$ represents a hydrocarbon group having from 1 to 20 carbon atoms; and X represents a halogen, hydrogen, an alkoxy group, or an amino group. $p$ represents an integer of from 1 to 3; and $q$ represents an integer of from 1 to 2. As $R^4$, an alkyl group is preferable; and as X, in the case where it represents a halogen, chlorine is preferable, in the case where it represents an alkoxy group, an alkoxy group having from 1 to 8 carbon atoms is preferable, and in the case where it represents an amino group, an amino group having from 1 to 8 carbon atoms is preferable, Above all, trialkylaluminums wherein $p$ is 3, and $q$ is 1 and dialkylaluminum hydrides wherein $p$ is 2, and $q$ is 1 are preferable. Trialkylaluminums where $R^4$ has from 1 to 8 carbon atoms are further preferable.

As the carrier that can be used as the need arises, porous oxides of organic or inorganic compounds are preferable. Specific examples include $SiO_2$, $Al_2O_3$, $MgO$, $ZrO_2$, $TiO_2$, $B_2O_3$, $CaO$, $ZnO$, $BaO$, and $ThO_2$, or mixtures thereof, and $SiO_2$—$Al_2O_3$, $SiO_2$—$V_2O_5$, $SiO_2$—$TiO_2$, $SiO_2$—$MgO$, and $SiO_2$—$Cr_2O_3$. It is particularly preferable to use ion-exchangeable phyllosilicates having both a function as the carrier and a function as the co-catalyst.

[Laminated Film]

The laminated film of the invention is a laminated film prepared by laminating the foregoing ethylene based resin on the surface of a propylene based resin film formed from the foregoing crystalline propylene based random copolymer resin by melt extrusion lamination without via an anchor coating agent.

As the formation method of propylene based resin films, any known methods such as an inflation method and a T die method can be employed. Further, the propylene based resin film may be unstretched or uniaxially or biaxially stretched.

The propylene based resin film may be subjected to a known surface treatment such as corona treatment, flame treatment, and plasma treatment.

Also, the propylene based resin film can be used as a single-layered film or a multilayered film in which other resin layer is laminated on an opposite side to the surface where the foregoing ethylene based resin is laminated.

The ethylene based resin is subjected to melt extrusion lamination on the surface of the foregoing propylene based resin film without via an anchor coating agent, to form a laminated film. The melt extrusion temperature of the ethylene based resin is from 150 to 300° C., and preferably from 180 to 280° C. When the melt extrusion temperature exceeds 300° C., print laminate adaptability may possibly become worse, whereas when it is lower than 150° C., the adhesive strength tends to lower.

In the laminated film of the invention, the propylene based resin film has a thickness of from 1 to 250 μm, preferably from 3 to 200 μm, and particularly preferably from 5 to 150 μm, and the ethylene based resin has a thickness of from 1 to 250 μm, preferably from 5 to 200 μm, and particularly preferably from 7 to 100 μm.

Nevertheless no anchor coating agent is used, the thus obtained laminated film exhibits a practically sufficient interlaminar adhesive strength. It is desired that the interlaminar adhesive strength is 60 g/15 mm or more, preferably 80 g/15 mm or more, and more preferably 130 g/15 mm or more.

Other layers for purposes of imparting various functions to the film, such as plastic films, aluminum foils, and papers, can be laminated on the laminated film of the invention within the range where the effects of the invention are not hindered. In addition, if desired, the laminated film of the invention may be subjected to various film processing treatments such as metallic vapor deposition processing, corona discharge treatment, printing processing, and crosslinking with electron beams.

The laminated film of the invention can be used as a heat seal film or a print laminate film while applying the ethylene based resin layer as a heat seal layer or a thermocompression bonding layer. A preferred embodiment as the print laminate film will be hereunder described.

[Print Laminate Film]

In the case where the laminated film of the invention is used as a print laminate film, the propylene base resin film is preferably a biaxially stretched polypropylene film prepared by extruding a propylene based resin and the crystalline propylene based random copolymer resin as described above in detail into a two-layered sheet form by co-extrusion and stretching it in the machine direction and the transverse direction. The propylene based resin is properly selected from propylene homopolymers and propylene/α-olefin random copolymers each having an MFR of from 0.1 to 50 g/10 min. and a melting point of from 150 to 180° C. from the viewpoints of gloss and stiffness. Above all, propylene homopolymers having an NFR of from 1 to 10 g/10 min. and a melting point of from 155 to 170° C. are preferable.

An ethylene based resin is subjected to melt extrusion lamination on the surface of the crystalline propylene based random copolymer resin layer of the biaxially stretched polypropylene film without via an anchor coating agent and then provided for a print laminate film. In the thus obtained print laminate film, for making the adhesion to a printing surface of a sheet-like material good, it is preferable that the ethylene based resin layer surface is subjected to oxidation treatment such as corona treatment and ozone treatment. Especially, the corona treatment is simplest and effective.

The thus obtained print laminate film is thermocompression bonded onto a printing paper to prepare a print laminate article. The thermocompression bonding can be carried out using heat rollers having a temperature of from 60 to 120° C. under a pressure such that a roller linear pressure between the thermocompression bonding layer of the print laminate film and the printing paper is from 5 to 100 kg.

EXAMPLES

The invention will be specifically described below in detail with reference to the following Examples, but it should not be construed that the invention is limited to these Examples.

1. Evaluation Method of Film (1) Adhesive Strength Between Ethylene Based Resin Layer and Propylene Based Resin Film Layer:

A laminated film was cut into a specimen having a width of 15 mm and a length of 100 mm, and a 50 mm-portion thereof in the lengthwise direction was peeled by fingers and then peeled in a direction of 90° at a tensile rate of 300 mm/min. and measured for a tensile strength using a tensile tester manufactured by Shimadzu Corporation.

2. Evaluation Methods of Print Laminate Article (1) Gloss:

A glossiness (20 degree) of a printing portion of a print laminate article was measured according to JIS-K7150. UGV-5DP (trade name) manufactured by Suga Test Instruments Co., Ltd. was used as an analyzer.

(2) Collapse Properties:

Collapse properties (adhesion between a printing paper and a laminated adhesive resin) were visually observed and evaluated according to the following evaluation criteria.

| Collapse state of appearance | Evaluation |
| --- | --- |
| No residual air was present at all, and a printed color was clear. | A |
| Air remained in a stripe state or as spots on a printed color. | B |
| Air remained in a strip state, and a printed color was not unclear. | C |

(3) Adhesive Strength Between Print Laminate Film and Printing Paper:

A laminated film was cut into a specimen having a width of 25 mm and a length of 100 mm, and a 50 mm-portion thereof in the lengthwise direction was peeled by fingers and then peeled in a direction of 180° at a tensile rate of 300 mm/min. and measured for a tensile strength using a tensile tester manufactured by Shimadzu Corporation.

(4) Tunneling Properties:

A light oil (10 μL) was added dropwise onto the surface of a print laminate article, on which a printing paper was not laminated, using a microsyringe and allowed to stand in an atmosphere at a temperature of 23° C. and at a humidity of 50%. After elapse of 24 hours, any change of the laminated film surface was observed and evaluated according to the following evaluation criteria.

Evaluation of Tunneling Properties

A: No problems in adhesive strength and appearance occurred at all.
B: Adhesive strength slightly lowered, but no change in appearance occurred (durable to use).
C: Graininess slightly occurred.
D: Tunneling evidently occurred.

3. Resins Used for Test

PP-1: Crystalline propylene homopolymer, Novatec PP FL6CK (manufactured by Japan Polychem Corporation)

PP-2: Propylene-ethylene random copolymer resin, which was prepared in the following method.

Preparation of Co-catalyst:

In a separable flask, 96% sulfuric acid (750 g) was added to 1,130 g of distilled water, to which was then added a smectite based silicate (Benclay SL manufactured by Mizusawa Chemical Industries, Ltd.; mean particle size: 27 μm; 300 g) at 30° C. This slurry was raised to a temperature of 90° C. over one hour at a rate of 1.0° C./min. and allowed to react at 90° C. for 300 minutes. The reaction slurry was cooled to room temperature over one hour and washed with distilled water until the pH reached 3. The resulting solid was preliminarily dried at 130° C. for 2 days in a nitrogen gas stream, coarse particles of 53 μm or larger were removed, and the residue was further dried in vacuo at 200° C. for 2 hours to obtain 208.3 g of a smectite.

In a separable flask, 521 g of distilled water was added to lithium sulfate monohydrate (211 g) to form a solution, to which was then added the foregoing smectite. This slurry was stirred at room temperature for 240 minutes and filtered by a Nutsche funnel to obtain a clay cake. To this cake was added 3,000 g of distilled water to form a slurry, which was then stirred for 10 minutes and again filtered to obtain a cake. This operation was repeated three times (the final filtrate had a pH of 6), the resulting cake was preliminarily dried at 130° C. for one day in a nitrogen gas stream, coarse particles of 53 μm or larger were removed, and the residue was further dried in vacuo at 200° C. for 2 hours to obtain 80 g of a chemically treated smectite.

Preparation of Solid Catalyst Component:

In a three-necked flask (volume: 1 L), 20 g of the above obtained chemically treated smectite was charged, to which was then added heptane (73 mL) to form a slurry. Tri-n-octylaluminum (50 mmoles; 126.3 mL of a heptane solution having a concentration of 145.2 mg/mL) was added to this slurry, and the mixture was stirred for one hour and washed with heptane to 1/100, to which was then added heptane such that the total volume was 200 mL.

Further, in another flask (volume: 200 mL), (r-)dichloro[1,1'-dimethylsilylenebis{2-methyl-4-(4-chlorophenyl)-4H-azulenyl}]zirconium (0.3 mmoles) was added to heptane (87 mL) containing 3% by weight of toluene to form a slurry, to which was then added triisobutylaluminum (1.5 mmoles; 2.13 mL of a heptane solution having a concentration of 140 mg/mL). The mixture was stirred and allowed to react at room temperature for 60 minutes. This solution was charged into the 1-L flask charged with the foregoing chemically treated smectite having been reacted with tri-n-octylaluminum, and stirred at room temperature for 60 minutes. Thereafter, 213 mL of heptane was added thereto, and this slurry was introduced into a 1-L autoclave.

After adjusting the internal temperature of the autoclave at 40° C., propylene was preliminarily polymerized for 2 hours at a rate of 10 kg/hr. while keeping at 40° C. Thereafter, the propylene feed was stopped, and post polymerization was carried out at the internal temperature of 40° C. for one hour. A supernatant of the resulting catalyst slurry was removed by decantation, and the solid was dried in vacuo for 3 hours to obtain 72.9 g of a dried preliminary polymerization catalyst.

Polymerization:

Into a reactor having an inner volume of 400 L, liquid propylene, ethylene, hydrogen, and a hexane-diluted solution of triisobutylaluminum were continuously fed, and the internal temperature was kept at 60° C. Feed amounts of propylene, ethylene, hydrogen and tirisobutylaluminum were 123 kg/hr., 3.5 kg/hr., 0.21 g/hr. and 25 g/hr, respectively. The foregoing preliminary polymerization catalyst was adjusted in a liquid paraffin (Whiterex 335 manufactured by Tonen Corporation) such that the concentration was 20% by weight and fed at a rate of 3.0 g/hr. As a result, there was obtained 19 kg/hr. of a propylene/ethylene random copolymer.

introduced in a propylene atmosphere at 55° C. Additionally, propylene and ethylene were fed in feed rates of 5.8 kg/hr. and 0.36 kg/hr., respectively at a temperature of 55° C. for 4 hours while keeping the hydrogen concentration in the vapor phase at 5.5% by volume, followed by continuing the polymerization for an additional one hour. Thereafter, the product was filtered and dried to obtain a propylene/ethylene random copolymer.

PP-5: Propylene-ethylene random copolymer resin, Novatec PP FG7F (manufactured by Japan Polychem Corporation).

Physical properties of the foregoing PP-1 to PP-5 are summarized in Table 1.

TABLE 1

| | | Comonomer (content) (weight %) | Tm (° C.) | MFR (g/10 min.) | Mw/Mn | $\Delta Hm_{130}$ (J/g) | $\Delta Hm$ (J/g) | $\Delta Hm_{130}/\Delta Hm$ | Polymerization catalyst |
|---|---|---|---|---|---|---|---|---|---|
| PP-1 | Homopolymer | — | 161.5 | 2.4 | 4.2 | 7 | 102.9 | 0.07 | Mg-supported Ti based |
| PP-2 | Random copolymer | Ethylene (3.8) | 125.2 | 9.4 | 2.7 | 59.8 | 60.4 | 0.99 | Metallocene based |
| PP-3 | Random copolymer | Ethylene (1.4) | 137.0 | 6.1 | 2.7 | 45.8 | 73.9 | 0.62 | Metallocene based |
| PP-4 | Random copolymer | Ethylene (5.2) | 136.0 | 5.1 | 3.7 | 48.5 | 77 | 0.63 | TiCl$_3$ based |
| PP-5 | Random copolymer | Ethylene (3.3) | 143.0 | 1.3 | 6.2 | 28.4 | 81 | 0.35 | Mg-supported Ti based |

PP-3: Propylene-ethylene random copolymer resin, which was prepared in the following method.

Preparation of Catalyst:

Into an agitating blade-equipped glass-made reactor having an inner volume of 0.5 L, 2.4 of SiO$_2$-supported methylaluminoxane (20.7 mmoles-Al) manufactured by WITCO was added, and 50 mL of n-heptane was introduced. Then, 20.0 mL (0.0637 mmoles) of an (r-)dimethylsilylenebis(2-methylbenzoindenyl)zirconium dichloride solution having been previously diluted in toluene, and subsequently, 4.14 mL (3.03 mmoles) of a solution of triisobutylaluminum in n-heptane was added. The mixture was allowed to react at room temperature for 2 hours, and propylene was then flown to undergo preliminary polymerization.

Polymerization:

After thoroughly purging the inside of an agitation type autoclave having an inner volume of 200 L with propylene, 3 g of triethylaluminum diluted with n-heptane, 45 kg of liquefied propylene, and 0.77 kg of ethylene were introduced, and the internal temperature was kept at 30° C. Subsequently, 1.0 g of the previously synthesized solid catalyst (in terms of weight excluding the preliminarily polymerized polymer) was added. Thereafter, the temperature was raised to 65° C. to start polymerization, and that temperature was kept for 3 hours. Then, 100 mL of ethanol was added to stop the reaction. The residual gas was purged to obtain a propylene/ethylene random copolymer.

PP-4: Propylene-ethylene random copolymer resin, which was prepared in the following method.

After thoroughly purging an agitation type autoclave having an inner volume of 200 L with propylene, 60 L of purified n-heptane was introduced, and 45 g of diethylaluminum chloride and 16 g of a titanium trichloride catalyst manufactured by Marubeni Solvay Co., Ltd. were then Next, ethylene based resins used in the Examples and Comparative Examples will be hereunder described.

LLDPE-1: Ethylene/1-hexene copolymer resin, MFR: 30 g/10 min., density: 0.880 g/cm$^3$, Mw/Mn: 2.0, elution amount at 80° C. in temperature rising elution fractionation (TREF): 100% by weight (Kernel KJ640 (trade name) manufactured by Japan Polychem Corporation), metallocene based material.

LLDPE-2: Ethylene/1-hexene copolymer resin, MFR: 11 g/10 min., density: 0.920 g/cm$^3$, Mw/Mn: 2.4, elution amount at 80° C. in temperature rising elution fractionation (TREF): 87% by weight (Kernel KC581 (trade name) manufactured by Japan Polychem Corporation), metallocene based material.

LPDE: High-pressure process low-density polyethylene, MFR: 14 g/10 min., density: 0.919 g/cm$^3$ (Novatec LD LC701 (trade name) manufactured by Japan Polychem Corporation).

4. Preparation of Propylene Based Resin Film (1) OPP-1:

PP-1 was charged in an extruder, extruded from a T die so as to obtain a stretched film having a total thickness of 15 µm, and quenched by cooling rollers to obtain a sheet having a thickness of 0.6 mm. This sheet was stretched 5 times in the machine direction at 110° C. using a tenter type sequential biaxial stretching machine, preliminarily heated at 160° C. in a tenter furnace, stretched 9 times in the transverse direction at 158° C., and then subjected to heat setting at 158° C. while relaxing with 5% to obtain a single-layered biaxially stretched polypropylene based film (OPP-1) having a total film thickness of 15 µm.

(2) OPP-2:

A PP-2 powder (100 parts by weight) was compounded with 0.1 parts by weight of Irganox 1010 manufactured by Ciba-Geigy and 0.1 parts by weight of Irgafos 168 manufactured by Ciba-Geigy as antioxidants, and 0.05 parts by weight of calcium stearate. The mixture was stirred by a Henschel mixer, melt extruded by an extruder, and then pelletized to obtain a resin composition for surface layer.

PP-1 to be used for an interlayer and the foregoing resin composition for surface layer to be used for a surface layer were individually charged into two extruders, co-extruded from a T die such that when processed into a stretched film having a total thickness of the two layers of 15 μm, a skin layer thereof had a thickness of 2 μm, and then quenched by cooling rollers to obtain a sheet having a thickness of 0.6 mm. This sheet was stretched 5 times in the machine direction at 110° C. using a tenter type sequential biaxial stretching machine, preliminarily heated at 160° C. in a tenter furnace, stretched 9 times in the transverse direction at 158° C., and then subjected to heat setting at 158° C. while relaxing with 5% to obtain a two-kind two-layered biaxially stretched polypropylene based film (OPP-2) having a total film thickness of 15 μm and a surface layer thickness of 2 μm.

(3) OPP-3:

A two-kind two-layered biaxially stretched polypropylene based film (OPP-3) having a total film thickness of 15 μm and a surface layer thickness of 2 μm was obtained in the same manner as in the preparation of OPP-2, except for using a PP-3 powder as the raw material PP of the resin composition for surface layer.

(4) OPP-4:

A two-kind two-layered biaxially stretched polypropylene based film (OPP-4) having a total film thickness of 15 μm and a surface layer thickness of 2 μm was obtained in the same manner as in the preparation of OPP-2, except for using a PP-4 powder as the raw material PP of the resin composition for surface layer.

(5) OPP-5:

PP-1 to be used for an interlayer and PP-5 to be used for a surface layer were individually charged into two extruders, co-extruded from a T die such that when processed into a stretched film having a total thickness of the two layers of 15 μm, a skin layer thereof had a thickness of 2 μm, and then quenched by cooling rollers to obtain a sheet having a thickness of 0.6 mm. This sheet was stretched 5 times in the machine direction at 110° C. using a tenter type sequential biaxial stretching machine, preliminarily heated at 160° C. in a tenter furnace, stretched 9 times in the transverse direction at 158° C., and then subjected to heat setting at 158° C. while relaxing with 5% to obtain a two-kind two-layered biaxially stretched polypropylene based film (OPP-5) having a total film thickness of 15 μm and a surface layer thickness of 2 μm.

(6) OPP-6:

A PP-2 powder (100 parts by weight) was compounded with 0.1 parts by weight of Irganox 1010 manufactured by Ciba-Geigy and 0.1 parts by weight of Irgafos 168 manufactured by Ciba-Geigy as antioxidants, and 0.05 parts by weight of calcium stearate. The mixture was stirred by a Henschel mixer, melt extruded by an extruder, and then pelletized to obtain a resin composition.

The foregoing resin composition was charged in an extruder, extruded from a T die, and then quenched by cooling rollers to obtain a sheet having a thickness of 0.6 mm. This sheet was stretched 5 times in the machine direction at 110° C. using a tenter type sequential biaxial stretching machine, preliminarily heated at 160° C. in a tenter furnace, stretched 9 times in the transverse direction at 158° C., and then subjected to heat setting at 158° C. while relaxing with 5% to obtain a single-layered biaxially stretched polypropylene based film (OPP-6) having a total film thickness of 15 μm.

Example 1

(1) A polyethylene mixture of 90% by weight of LLDPE-1 and 10% by weight of LDPE was melt extruded into a film having a width of 500 mm and a thickness of 15 μm at a resin temperature of 250° C. from a T die installed in an extruder having a bore of 90 mm.

(2) Next, OPP-2 was fed from a substrate feeding section of an extrusion laminating device, and the film melt extruded from the T die was subjected to compression bonding lamination on the surface layer of OPP-2 by a surface-matted cooling roller and a compression rubber roller. Further, the surface of the adhesive resin layer of the laminated film was subjected to corona discharge treatment of 20 w·min./m² to obtain a laminated film.

(3) Next, the corona-treated surface of the resulting laminated film and an offset printed art paper were subjected to thermocompression bonding by a compression bonding machine at a roller temperature of 70° C., 80° C. and 100° C., at a linear pressure of 55.6 kg and at a rate of 30 m/min. to obtain print laminate article.

(4) Results obtained by evaluating the laminated film and the article thermocompression bonded on a printing paper in the foregoing methods are shown in Tables 2 and 3.

Example 2

(1) A polyethylene mixture of 80% by weight of LLDPE-1 and 20% by weight of LDPE, which is to be used for an inter layer, and LLDPE-1 to be used for a surface layer were individually melt co-extruded into a two-layered film having a width of 500 mm and a thickness of 7 μm and 8 μm, respectively at a resin temperature of 250° C. from a T die installed in each of two extruders having a bore of 65 mm.

(2) Next, OPP-2 was fed from a substrate feeding section of an extrusion laminating device, and the two-layered film melt co-extruded from the T-dies was subjected to compression bonding lamination on the surface layer of OPP-2 such that the interlayer was faced at the surface layer of OPP-2 by a surface-matted cooling roller and a compression rubber roller. Further, the surface of the surface layer of the adhesive resin of the laminated film was subjected to corona discharge treatment of 20 w·min./m² to obtain a laminated film.

(3) Subsequently, the same procedures as in Example 1 were followed. The results are shown in Tables 2 and 3.

Example 3

The same procedures as in Example 2 were followed, except for changing the resin temperature of melt co-extrusion of the polyethylene mixture to 220° C. in Example 2-(1). The results are shown in Tables 2 and 3.

Example 4

The same procedures as in Example 2 were followed, except for changing OPP-2 to OPP-3 in Example 2-(2). The results are shown in Tables 2 and 3.

Comparative Example 1

The same procedures as in Example 1 were followed, except for changing OPP-2 to OPP-1 in Example 1-(2). The results are shown in Tables 2 and 3. The adhesive strength between the polyethylene layer and the biaxially stretched polypropylene based film layer was remarkably inferior, and the print laminate article was insufficient in any of gloss, collapse properties, adhesive strength to printing paper, and tunneling properties and did not exhibit print laminate adaptability.

Comparative Example 2

The same procedures as in Example 1 were followed, except for changing OPP-2 to OPP-1 in Example 2-(2). The results are shown in Tables 2 and 3. The adhesive strength between the polyethylene layer and the biaxially stretched polypropylene based film layer was remarkably inferior, and the print laminate article was insufficient in any of gloss, collapse properties, adhesive strength to printing paper, and tunneling properties and did not exhibit print laminate adaptability.

Comparative Example 3

(1) LLDPE-2 was melt extruded into a film having a width of 500 mm and a thickness of 15 μm at a resin temperature of 250° C. from a T die installed in an extruder having a bore of 90 mm.
(2) Next, OPP-2 was fed from a substrate feeding section of an extrusion laminating device, and the film melt extruded from the T die was subjected to compression bonding lamination on the surface layer of OPP-2 by a surface-matted cooling roller and a compression rubber roller. Further, the surface of the adhesive resin layer of the laminated film was subjected to corona discharge treatment of 20 w·min./m² to obtain a laminated film.
(3) Subsequently, the same procedures as in Example 1 were followed. The results are shown in Tables 2 and 3. Though the adhesive strength between the polyethylene layer and the biaxially stretched propylene based film layer was sufficient, the print laminate article was remarkably inferior in any of gloss, collapse properties, adhesive strength to printing paper, and tunneling properties and did not exhibit print laminate adaptability.

Comparative Example 4

(1) A mixture of 80% by weight of LLDPE-1 and 20% by weight of LPDE, which is to be used for an interlayer and LLDPE-1 to be used for a surface layer were individually melt co-extruded into a two-layered film having a width of 500 mm and a thickness of 7 μm and 8 μm, respectively at a resin temperature of 250° C. from a T die installed in each of two extruders having a bore of 65 mm.
(2) Next, OPP-5 was fed from a substrate feeding section of an extrusion laminating device, and the two-layered film melt co-extruded from the T-dies was subjected to compression bonding lamination on the surface layer of OPP-5 such that the interlayer was faced at the surface layer of OPP-5 by a surface-matted cooling roller and a compression rubber roller. Further, the surface of the surface layer of the adhesive resin of the laminated film was subjected to corona discharge treatment of 20 w·min./m² to obtain a laminated film.
(3) Subsequently, the same procedures as in Example 1 were followed. The results are shown in Tables 2 and 3. The adhesive strength between the polyethylene layer and the biaxially stretched propylene based film layer was slightly insufficient, and the print laminate article was insufficient in any of gloss, collapse properties, adhesive strength to printing paper, and tunneling properties and did not exhibit print laminate adaptability.

Comparative Example 5

The same procedures as in Example 2 were followed, except for changing OPP-2 to OPP-4 in Example 2-(2). The results are shown in Tables 2 and 3.

Example 5

The same procedures as in Example 1 were followed, except for changing OPP-2 to OPP-6 in Example 1-(2). The results are shown in Tables 2 and 3.

Example 6

The same procedures as in Example 2 were followed, except for changing OPP-2 to OPP-6 in Example 2-(2). The results are shown in Tables 2 and 3.

TABLE 2

| | Propylene based resin film | Ethylene based resin | | Laminate temperature (° C.) | Adhesive strength* (g/15 mm) |
| --- | --- | --- | --- | --- | --- |
| | | Interlayer (mixing weight ratio) | Surface layer | | |
| Example 1 | OPP-2 | LLDPE-1 (90) + LPDE (10) | — | 250 | 170 |
| Example 2 | OPP-2 | LLDPE-1 (80) + LPDE (20) | LLDPE-1 (100) | 250 | 170 |
| Example 3 | OPP-2 | LLDPE-1 (80) + LPDE (20) | LLDPE-1 (100) | 220 | 150 |
| Example 4 | OPP-3 | LLDPE-1 (80) + LPDE (20) | LLDPE-1 (100) | 250 | 140 |
| Comparative Example 1 | OPP-1 | LLDPE-1 (90) + LPDE (10) | — | 250 | 10 |
| Comparative Example 2 | OPP-1 | LLDPE-1 (80) + LPDE (20) | LLDPE-1 (100) | 250 | 10 |
| Comparative Example 3 | OPP-2 | LLDPE-2 (100) | — | 250 | 100 |
| Comparative Example 4 | OPP-5 | LLDPE-1 (80) + LPDE (20) | LLDPE-1 (100) | 250 | 50 |
| Comparative Example 5 | OPP-4 | LLDPE-1 (80) + LPDE (20) | LLDPE-1 (100) | 250 | 120 |

TABLE 2-continued

| | Propylene based resin film | Ethylene based resin | | Laminate temperature (° C.) | Adhesive strength* (g/15 mm) |
|---|---|---|---|---|---|
| | | Interlayer (mixing weight ratio) | Surface layer | | |
| Example 5 | OPP-6 | LLDPE-1 (90) + LPDE (10) | — | 250 | 170 |
| Example 6 | OPP-6 | LLDPE-1 (80) + LPDE (20) | LLDPE-1 (100) | 250 | 170 |

*Adhesive strength between propylene based resin film and ethylene based resin

TABLE 3

| | Gloss (%) Roller temperature (° C.) | | | Collapse properties Roller temperature (° C.) | | | Adhesive strength** (g/25 mm) Roller temperature (° C.) | | | Tunneling properties Roller temperature (° C.) | | |
|---|---|---|---|---|---|---|---|---|---|---|---|---|
| | 70 | 80 | 100 | 70 | 80 | 100 | 70 | 80 | 100 | 70 | 80 | 100 |
| Example 1 | 75 | 85 | 90 | C | B | A | 150 | 350 | 670 | C | B | A |
| Example 2 | 90 | 92 | 96 | A | A | A | 760 | 1020 | 1150 | A | A | A |
| Example 3 | 90 | 92 | 96 | A | A | A | 760 | 1010 | 1130 | A | A | A |
| Example 4 | 88 | 90 | 96 | A | A | A | 720 | 990 | 1110 | A | A | A |
| Comparative Example 1 | 50 | 65 | 80 | C | C | B | 50 | 150 | 200 | D | D | C |
| Comparative Example 2 | 55 | 70 | 82 | C | C | B | 50 | 170 | 240 | D | D | C |
| Comparative Example 3 | 50 | 60 | 78 | C | C | C | 10 | 50 | 180 | D | D | D |
| Comparative Example 4 | 65 | 70 | 85 | C | C | A | 100 | 220 | 380 | D | C | B |
| Comparative Example 5 | 85 | 88 | 93 | A | A | A | 680 | 840 | 1080 | B | A | A |
| Example 5 | 73 | 84 | 90 | C | B | A | 160 | 370 | 690 | C | B | A |
| Example 6 | 91 | 94 | 96 | A | A | A | 750 | 1040 | 1140 | A | A | A |

**Adhesive strength between resin film and printing paper

INDUSTRIAL APPLICABILITY

A laminated film prepared by laminating an ethylene based resin mainly comprising a specific linear ethylene/α-olefin copolymer on a propylene based resin film formed from a specific crystalline propylene based random copolymer resin without via an anchor coating agent by melt extrusion lamination has a high interlaminar adhesive force between a propylene based resin film layer and an ethylene based resin layer. For this reason, the laminated film does not require an anchor coating agent and does not require solvent removal and recovery devices, etc., and hence, can avoid influences against working environments and a danger of occurrence of fire. Further, a print laminate article prepared by compression bonding to a printing paper is an article having a high adhesive strength to the printing paper and having an excellent appearance. Moreover, print lamination on a printing body can be achieved at low temperatures, and discoloration of printing inks on the article and curling can be prevented.

The invention claimed is:

1. A process for producing a laminated film which comprises:
   melt extrusion laminating, without using an anchor coating agent, an ethylene based resin comprising a linear ethylene/α-olefin copolymer having a density of from 0.870 to 0.910 g/cm$^3$; and a melt flow rate (MFR) of from 1 to 100 g/10 min.,
   wherein the copolymer is obtained by copolymerizing ethylene and an α-olefin having from 3 to 20 carbon atoms,
   on the surface of a propylene based resin film formed from a crystalline propylene based random copolymer resin having a melting peak temperature of not higher than 140° C., wherein the crystalline propylene based random copolymer resin is prepared using a metallocene catalyst;
   wherein the crystalline propylene based random copolymer resin has a ratio ($\Delta Hm_{130}/\Delta Hm$), defined as the heat of fusion up to 130° C. ($\Delta Hm_{130}$) divided by the whole heat of fusion ($\Delta Hm$), of 0.5 or more, and
   wherein the laminated film has an interlaminar adhesive strength of 60 g/15 mm or more.

2. The process according to claim 1, wherein the ethylene based resin is a polyethylene mixture comprising:
   from 60 to 99% by weight of a linear ethylene/α-olefin copolymer having a density of from 0.870 to 0.910 g/cm$^3$ and a melt flow rate (MFR) of from 1 to 100 g/10 min., the copolymer being obtained by copolymerizing ethylene and an α-olefin having from 3 to 20 carbon atoms; and from 1 to 40% by weight of a high-pressure process low-density polyethylene having a melt flow rate (MFR) of from 1 to 50 g/10 min.

3. The process according to claim 2, wherein the crystalline propylene based random copolymer resin is a random copolymer of propylene and ethylene.

4. The process according to claim 2, wherein the crystalline propylene based random copolymer resin is uniaxially or biaxially stretched.

5. The process according to claim 1, wherein the linear ethylene/α-olefin copolymer has an elution amount at 80° C.

of 90% by weight or more by the temperature rising elution fractionation (TREF) measurement, based on the total amount of the copolymer.

6. The process according to claim 5, wherein the linear ethylene/α-olefin copolymer is prepared using a metallocene catalyst.

7. The process according to claim 1, wherein the linear ethylene/α-olefin copolymer is prepared using a metallocene catalyst.

8. The process according to any one of claims 1, 2 or 5, wherein the temperature of melt extrusion laminating the ethylene based resin is from 150 to 300° C.

9. The process according to claim 1, further comprising: thermal laminating the surface of the ethylene based resin of the laminated film with a printing paper, thereby obtaining a print laminate article.

10. The process according to claim 1, wherein the crystalline propylene based random copolymer resin is a random copolymer of propylene and ethylene.

11. The process according to claim 1, wherein the crystalline propylene based random copolymer resin is uniaxially or biaxially stretched.

12. The process according to claim 1, wherein the laminated film has an interlaminar adhesive strength of 80 g/15 mm or more.

13. The process according to claim 12, wherein the laminated film has an interlaminar adhesive strength of 130 g/15 mm or more.

14. A laminate film produced by the process of claim 1.

15. A laminate print article prepared by the process according to claim 9.

* * * * *